United States Patent
Donaghy et al.

(10) Patent No.: US 11,941,448 B2
(45) Date of Patent: Mar. 26, 2024

(54) ALLOCATING COMPUTING RESOURCES TO DATA TRANSFER JOBS BASED ON A COMPLETED AMOUNT AND AN ESTIMATED PRIORITY OF SYSTEM FAILURE

(71) Applicant: HEWLETT PACKARD ENTERPRISE DEVELOPMENT LP, Houston, TX (US)

(72) Inventors: Dave Donaghy, Bristol (GB); Shiraz Billimoria, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 315 days.

(21) Appl. No.: 17/011,327

(22) Filed: Sep. 3, 2020

(65) Prior Publication Data
US 2022/0066832 A1    Mar. 3, 2022

(51) Int. Cl.
G06F 9/50    (2006.01)
G06F 3/06    (2006.01)

(52) U.S. Cl.
CPC .......... *G06F 9/5027* (2013.01); *G06F 3/0604* (2013.01); *G06F 3/0631* (2013.01); *G06F 3/0647* (2013.01); *G06F 3/0676* (2013.01); *G06F 3/0677* (2013.01); *G06F 3/0679* (2013.01); *G06F 3/0682* (2013.01)

(58) Field of Classification Search
CPC .... G06F 9/5027; G06F 3/0604; G06F 3/0631; G06F 3/0647; G06F 3/0676; G06F 3/0677; G06F 3/0679; G06F 3/0682; G06F 3/0613; G06F 3/0659; G06F 3/067; G06F 9/5011; Y02D 10/00
See application file for complete search history.

(56) References Cited

U.S. PATENT DOCUMENTS

| | | | |
|---|---|---|---|
| 6,895,292 B2 | 5/2005 | Fromherz et al. | |
| 9,183,067 B2 | 11/2015 | Nakatsugawa et al. | |
| 9,262,216 B2 | 2/2016 | Bodik et al. | |
| 10,509,675 B2 | 12/2019 | Karmarkar et al. | |
| 10,616,314 B1 * | 4/2020 | Plenderleith | H04L 67/02 |
| 2008/0244601 A1 * | 10/2008 | Zeis | G06F 11/1458 714/E11.197 |
| 2009/0300633 A1 * | 12/2009 | Altrichter | G06F 9/4856 711/E12.001 |
| 2012/0260256 A1 * | 10/2012 | De Faria | G06F 9/5011 718/103 |

(Continued)

OTHER PUBLICATIONS

Cho, S.H. et al.; "A Simulation-based Process Model for Managing Complex Design Projects," Aug. 2005; 13 pages.

*Primary Examiner* — Jorge A Chu Joy-Davila
(74) *Attorney, Agent, or Firm* — Trop, Pruner & Hu, P.C.

(57) ABSTRACT

A computing device includes a processor and a machine-readable storage storing instructions. The instructions are executable by the processor to: determine a completed amount of data transferred for each of a plurality of data transfer jobs, each of the plurality of data transfer jobs to transfer data to a storage system; determine an estimated probability of failure for each of the plurality of data transfer jobs; and allocate computing resources of the storage system to the plurality of data transfer jobs based on the completed amount of data transferred and the estimated probability of failure of each of the plurality of data transfer jobs.

20 Claims, 6 Drawing Sheets

| Priority | Processor | Memory | Network | Storage |
|---|---|---|---|---|
| 1-10 | 60 | 45 | 40 | 35 |
| 10-100 | 20 | 30 | 30 | 25 |
| 100-500 | 10 | 15 | 15 | 12 |
| ⋮ | ⋮ | ⋮ | ⋮ | ⋮ |
| 1000-N | 2 | 1 | 2 | 5 |

300

(56) References Cited

U.S. PATENT DOCUMENTS

| | | | |
|---|---|---|---|
| 2013/0212277 A1* | 8/2013 | Bodik | G06F 9/4887 |
| | | | 709/226 |
| 2014/0215481 A1* | 7/2014 | Piet | G06F 11/2041 |
| | | | 718/104 |
| 2016/0359683 A1* | 12/2016 | Bartfai-Walcott | |
| | | | H04L 41/5009 |
| 2017/0094574 A1* | 3/2017 | Singh | H04W 36/245 |
| 2017/0202004 A1* | 7/2017 | Hurd | H04L 47/28 |
| 2017/0364307 A1* | 12/2017 | Lomelino | G06F 3/0659 |
| 2019/0278661 A1* | 9/2019 | Mehta | G06F 11/1464 |
| 2021/0240575 A1* | 8/2021 | Mulheren | G06F 11/1456 |
| 2021/0374568 A1* | 12/2021 | Vishwakarma | G06F 11/079 |

\* cited by examiner

| Priority | Processor | Memory | Network | Storage |
|---|---|---|---|---|
| 1-10 | 60 | 45 | 40 | 35 |
| 10-100 | 20 | 30 | 30 | 25 |
| 100-500 | 10 | 15 | 15 | 12 |
| ⋮ | ⋮ | ⋮ | ⋮ | ⋮ |
| 1000-N | 2 | 1 | 2 | 5 |

ALLOCATING COMPUTING RESOURCES TO DATA TRANSFER JOBS BASED ON A COMPLETED AMOUNT AND AN ESTIMATED PRIORITY OF SYSTEM FAILURE

BACKGROUND

Computing devices may include components such as a processor, memory, caching system, and storage device. The storage device may include a hard disk drive that uses a magnetic medium to store and retrieve data blocks. Some storage systems may transfer data between different locations or devices. For example, some systems may transfer and store copies of important data for archival and recovery purposes.

BRIEF DESCRIPTION OF THE DRAWINGS

Some implementations are described with respect to the following figures.

DETAILED DESCRIPTION

Storage systems may transfer data between locations or devices. For example, a backup system may receive data blocks stored in a computing device, and may store copies of the data blocks for archival and recovery purposes. As used herein, a "transfer job" refers to the transfer of specific data (e.g., file(s), data block(s), or the like) into a storage system. In some examples, a storage system can suffer a failure or error while one or more data transfer jobs are in progress, thereby causing the data transfer jobs to fail before completion. For example, the storage system may suffer a processor failure, a software application error, a network device failure, a power supply or storage disk failure, and so forth. Further, after the system error is resolved, additional work is performed to complete the data transfer jobs (e.g., error handling, retransmitting data, and so forth). Such additional work requires time and computing resources (referred to herein as "rework cost"), thereby resulting in reduced system performance and/or operating cost.

As described further below with reference to FIGS. 1-7, some implementations may include allocating computing resources to data transfer jobs to reduce the amount of rework cost due to system failures. In some implementations, the priority level of each data transfer job may be calculated based on the rework cost and the failure probability of the data transfer job. Further, each data transfer job may be allocated a proportion or level of computing resources based on the determined priority level, such that higher priority data transfer jobs get higher proportions of computing resources. In this manner, the high priority data transfer jobs may be completed more rapidly, and may thereby be less likely to be affected by a system failure.

Figure 1:
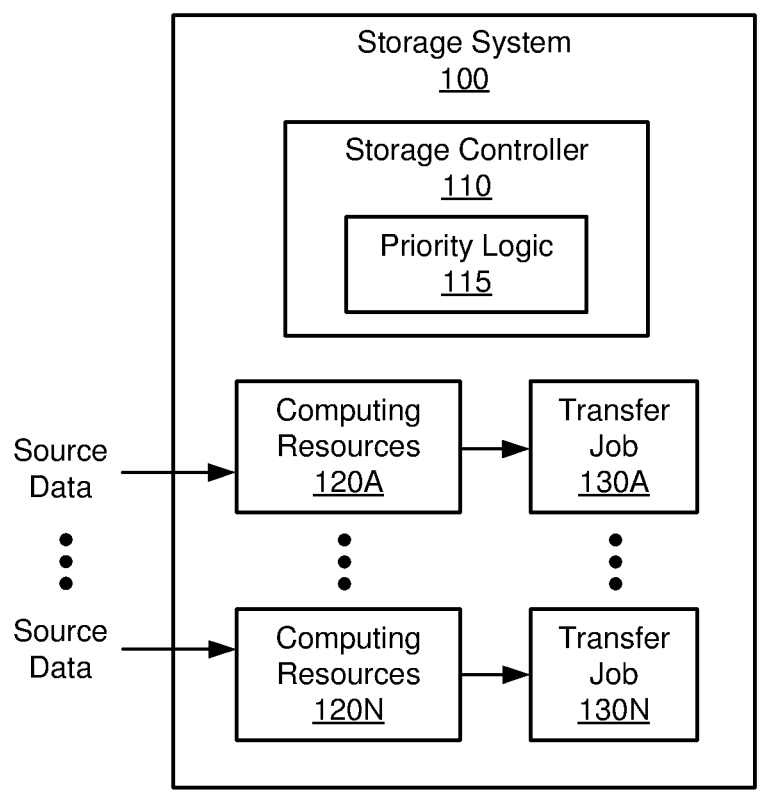
FIG. 1 is a schematic diagram of an example system, in accordance with some implementations.

Referring now to FIG. 1, shown is a schematic diagram of an example storage system 100, in accordance with some implementations. As shown, the storage system 100 may include a storage controller 110 to manage storage operations. For example, the storage controller 110 may control data transfers into or out of the storage system 100, encryption and decryption of stored data, backup operations, and so forth. The storage controller 110 may be implemented as a processor executing instructions (e.g., software and/or firmware) that are stored in a machine-readable storage medium, in hardware (e.g., circuitry), and so forth.

As shown, the storage controller 110 may include priority logic 115. In some implementations, the priority logic 115 may determine priority levels of any number of data transfer jobs 130A-130N (also referred to herein as "data transfer jobs 130") to transfer data into the storage system 100. Further, in some implementations, the priority logic 115 may allocate computing resources 120A-120N (also referred to herein as "computing resources 120") of the storage system 100 for use in performing the data transfer jobs 130. For example, referring to FIG. 2, the computing resources 120 may include processing resources 122 (e.g., central processing units, processing cores, threads, processing priorities, etc.), memory resources 124 (e.g., dynamic random access memory, static random access memory, caches, etc.), network resources 126 (e.g., network interfaces, routers, switches, etc.), and/or storage resources 128 (e.g., storage disks, redundant arrays, solid state storage, etc.).

Referring again to FIG. 1, in some implementations, the priority logic 115 may determine the rework costs of current data transfer jobs 130 based on the amount of data that has already been transferred in each data transfer job 130 at a given point in time. For example, in some implementations, the rework cost of a data transfer job 130 may be represented as the amount of data transferred in a given measurement unit (e.g., in bytes, in megabytes, etc.). The priority logic 115 may determine the types of current data transfer job 130, and may access historical data indicating past failures associated with the determined types. Further, the priority logic 115 may determine the failure probability of each data transfer job 130 based on this historical data.

In some implementations, the priority logic 115 may calculate a priority level of each data transfer job 130 by multiplying the rework cost and failure probability of each data transfer job 130. The priority logic 115 may then allocate a particular subset of the computing resources 120 to each data transfer job 130 based on the determined priority level. For example, a data transfer job 130 having a relatively higher priority level may be allocated a relatively larger proportion of the computing resources 120, while a data transfer job 130 having a relatively lower priority level may be allocated a relatively smaller proportion of the computing resources 120. In some implementations, the priority logic 115 may allocate the computing resources 120 using a stored data structure. An example data structure including allocations of computing resources 120 according to priority level is discussed below with reference to FIG. 3.

In one or more implementations, providing a high priority data transfer job 130 with additional computing resources 120 may allow that data transfer job 130 to be completed more quickly than it would be without those additional computing resources 120. In this manner, the amount of time that the high priority data transfer job 130 is potentially exposed to a system failure may be reduced, and therefore the high priority data transfer job 130 is less likely to be disrupted by a system failure (e.g., a processor failure, a software application freeze-up or error state, a time-out event, a network device failure, an operating system crash, a power supply failure, a storage disk failure, and so forth). Further, because the job priority of each job is based in part on the rework cost of that job (e.g., the amount of data already transferred), providing additional computing resources 120 to high priority data transfer jobs 130 (i.e., jobs having a relatively higher rework costs) may reduce the total amount of rework cost that would result in the event of a system failure.

In some implementations, the priority logic 115 may determine priority levels of data transfer jobs 130 and allocate computing resources at multiple points in time. For example, the priority logic 115 may determine priority levels according to a defined schedule (e.g., every Monday and Thursday, every day at 1:00 PM, etc.), a repeating time period (e.g., every 10 seconds, every minute, etc.), and so forth. Further, in some implementations, the priority logic 115 may determine priority levels in response to a defined event (e.g., the number of current data transfer jobs 130 exceeds a threshold number, a system interrupt, etc.), a command (e.g., a user command, an operating system command), and so forth.

In some implementations, the priority logic 115 may determine the priority levels of data transfer jobs 130 based on criteria other than the rework cost and failure probability. For example, the priority levels of data transfer jobs 130 may be based at least in part on service level agreement (SLA) requirements associated with specific clients or users. Further, the priority levels may be based at least in part on whether a data transfer job 130 is associated with a business-critical application. In some implementations, multiple different criteria may be evaluated to determine the priority levels, with the different criteria having different weight or importance. For example, a priority level based on an association with a business-critical application may outweigh or supersede a different priority level based on the rework cost and failure probability of a data transfer job 130.

Figures 2, 3:
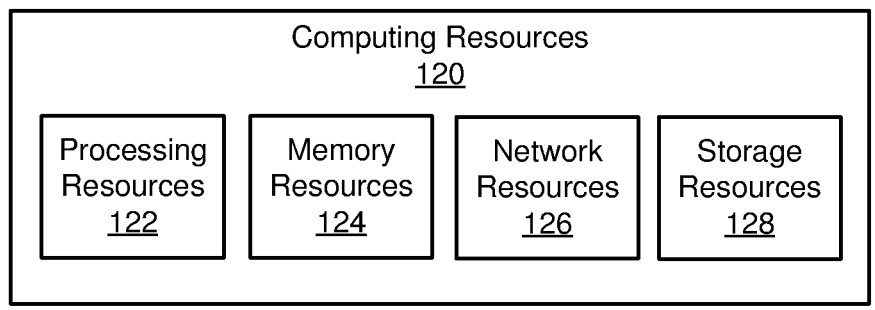
FIG. 2 is an illustration of example computing resources, in accordance with some implementations.
FIG. 3 is a schematic diagram of an example data structure, in accordance with some implementations.

Referring now to FIG. 3, shown is a data structure 300 to store allocations of computing resources by priority level, in accordance with one or more implementations. As shown, in some implementations, the data structure 300 may include multiple entries corresponding to different priority levels (or ranges of priority levels). Further, each entry of the data structure 300 may specify amounts and/or proportions of various computing resources of a storage system, such as processing resources, memory resources, network resources, storage resources, and so forth. For example, an entry of the data structure 300 may specify that a particular priority level is allocated particular amounts or proportions of processor bandwidth, disk input/output operations, memory space, network bandwidth, cache lines, processor cores, and so forth.

Figure 4:
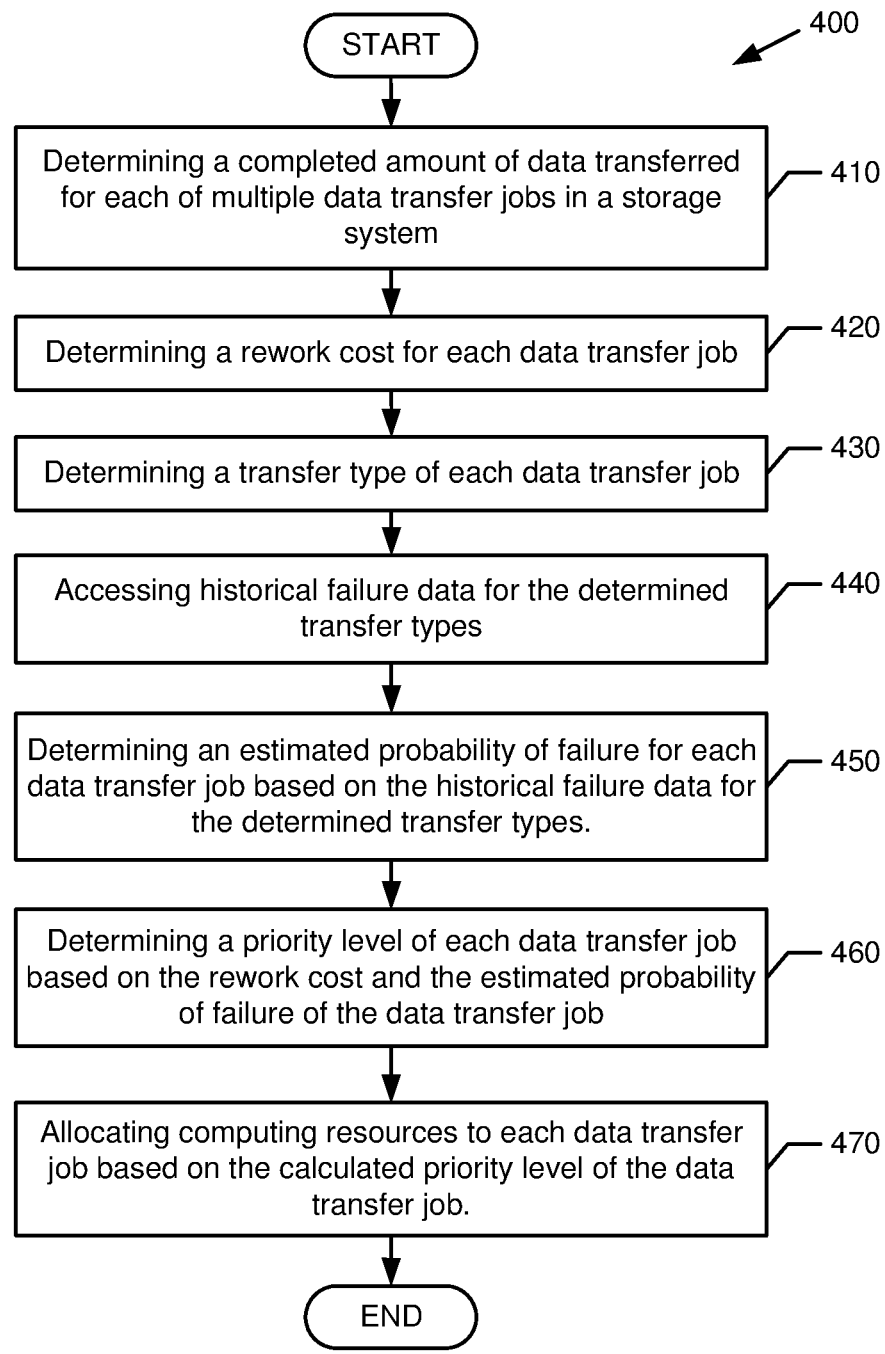
FIG. 4 is an illustration of an example process, in accordance with some implementations.

Referring now to FIG. 4, shown is an example process 400, in accordance with some implementations. In some examples, the process 400 may be performed using the storage controller 110 (shown in FIG. 1). The process 400 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 400 may be described below with reference to FIGS. 1-3, which show examples in accordance with some implementations. However, other implementations are also possible.

Block 410 may include determining a completed amount of data transferred (at a given point in time) for each of multiple data transfer jobs in a storage system. Block 420 may include determining a rework cost for each data transfer job. For example, referring to FIG. 1, the storage controller 110 may determine how much data has been transferred for each of the current data transfer jobs 130A-130N that are partially completed in the storage system 100. Further, the storage controller 110 may determine a rework cost based on the completed amount of each data transfer job 130. For example, in some implementations, the rework cost may be represented as the completed amount of data transferred in a given measurement unit (e.g., in bytes, in megabytes, etc.). In other examples, the rework cost of a data transfer job 130 may be calculated as a function of the completed amount of data transferred in a given measurement unit.

Block 430 may include determining a transfer type of each data transfer job. Block 440 may include accessing historical failure data for the determined transfer types. Block 450 may include determining an estimated probability of failure for each data transfer job based on the historical failure data for the determined transfer types. For example, referring to FIG. 1, the storage controller 110 may determine a transfer type of each data transfer job 130 based on characteristics of that data transfer job 130. For example, the transfer type may be based on one or more of a transfer protocol (e.g., Network File System, Common Internet File System, Virtual Tape Library, etc.), type of network connection (e.g., Ethernet, SCSI, FibreChannel, Wireless Local Area Network, etc.), type and/or version of software, type of the data being stored, data format, and so forth. In some implementations, the storage controller 110 may access historical data indicating the failure rate for past data transfers of the determined transfer types. Further, the storage controller 110 may estimate a probability of failure for each data transfer job 130 based on its associated failure rate as indicated by the historical data. In some implementations, the probability of failure may be a decimal number between 0 and 1 (e.g., 0.1, 0.250, 0.55, etc.).

Block 460 may include determining a priority level of each data transfer job based on the rework cost and the estimated probability of failure of the data transfer job. Block 470 may include allocating computing resources to each data transfer job based on the calculated priority level of the data transfer job. For example, referring to FIGS. 1-3, the storage controller 110 may calculate the priority level of each data transfer job 130 by multiplying the rework cost and failure probability of each data transfer job 130. Further, the storage controller 110 may allocate a particular subset of the computing resources 120 to each data transfer job 130 based on the determined priority level. For example, the storage controller 110 may perform a look-up in the data structure 300 based on the priority level determined for each data transfer job 130, and may allocate computing resources to the data transfer jobs 130 based on the allocation data returned by the look-up to the data structure 300. After block 470, the process 400 may be completed. Note that process 400 may be repeated as required (e.g., per a repeating period or a schedule, responsive to an event or command, and so forth).

Figure 5:
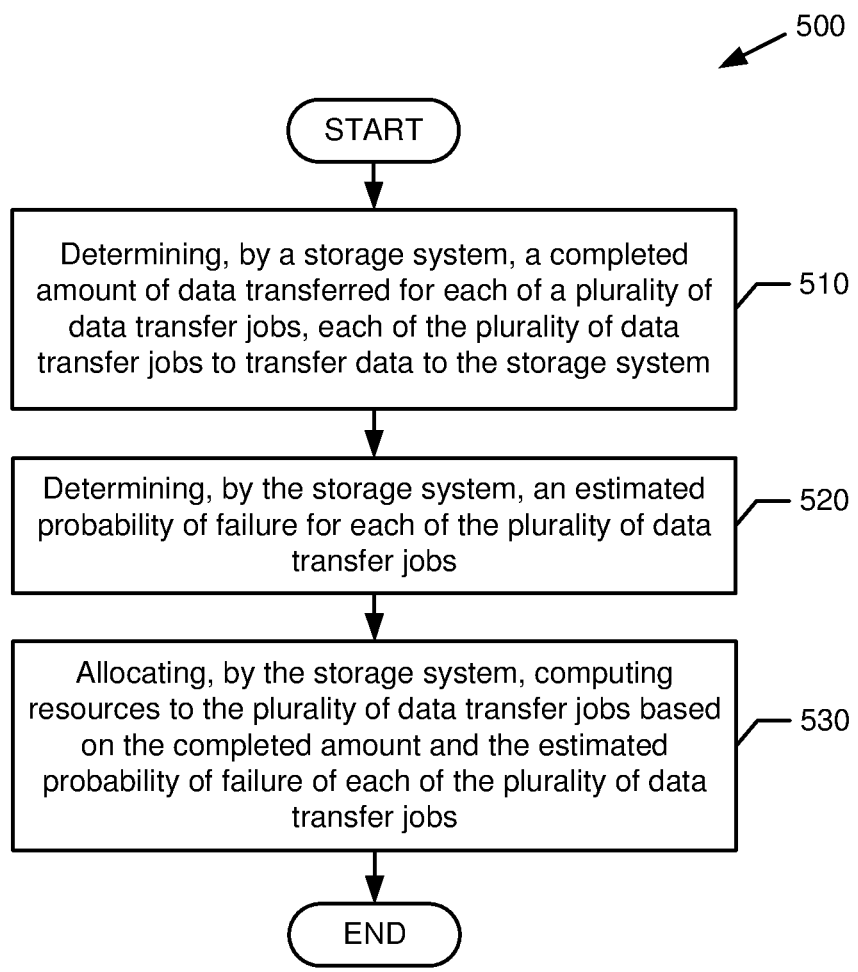
FIG. 5 is an illustration of an example process, in accordance with some implementations.

Referring now to FIG. 5, shown is an example process 500, in accordance with some implementations. In some examples, the process 500 may be performed using the storage controller 110 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 400 may be described below with reference to FIGS. 1-3, which show examples in accordance with some implementations. However, other implementations are also possible.

Block 510 may include determining, by a storage system, a completed amount of data transferred for each of a plurality of data transfer jobs, each of the plurality of data transfer jobs to transfer data to the storage system. For example, referring to FIG. 1, the storage controller 110 may determine how much data has already been transferred in each of the data transfer jobs 130A-130N. Further, the storage controller 110 may determine a rework cost based on the completed amount of each data transfer job 130.

Block 520 may include determining, by the storage system, an estimated probability of failure for each of the plurality of data transfer jobs. For example, referring to FIG. 1, the storage controller 110 may determine a transfer type of each data transfer job 130 based on its characteristics (e.g., transfer protocol, network connection type, software type, data type, data format, etc.). The storage controller 110 may perform a look-up to a data structure storing data indicating the historical failure rate for each transfer type, and may determine an estimated probability of failure for each data transfer job 130 based on the historical failure data.

Block 530 may include allocating, by the storage system, computing resources to the plurality of data transfer jobs based on the completed amount and the estimated probability of failure of each of the plurality of data transfer jobs. For example, referring to FIGS. 1-3, the storage controller 110 may calculate the priority level of each data transfer job 130 by multiplying the rework cost and failure probability of each data transfer job 130. Further, the storage controller 110 may allocate a particular subset of the computing resources 120 to each data transfer job 130 based on the determined priority level. For example, the storage controller 110 may perform a look-up in the data structure 300 based on the priority level determined for each data transfer job 130, and may allocate computing resources to the data transfer jobs 130 based on the allocation data returned by the look-up to the data structure 300. After block 530, the process 500 may be completed. Note that process 500 may be repeated as required (e.g., per a repeating period or a schedule, responsive to an event or command, and so forth).

Figure 6:
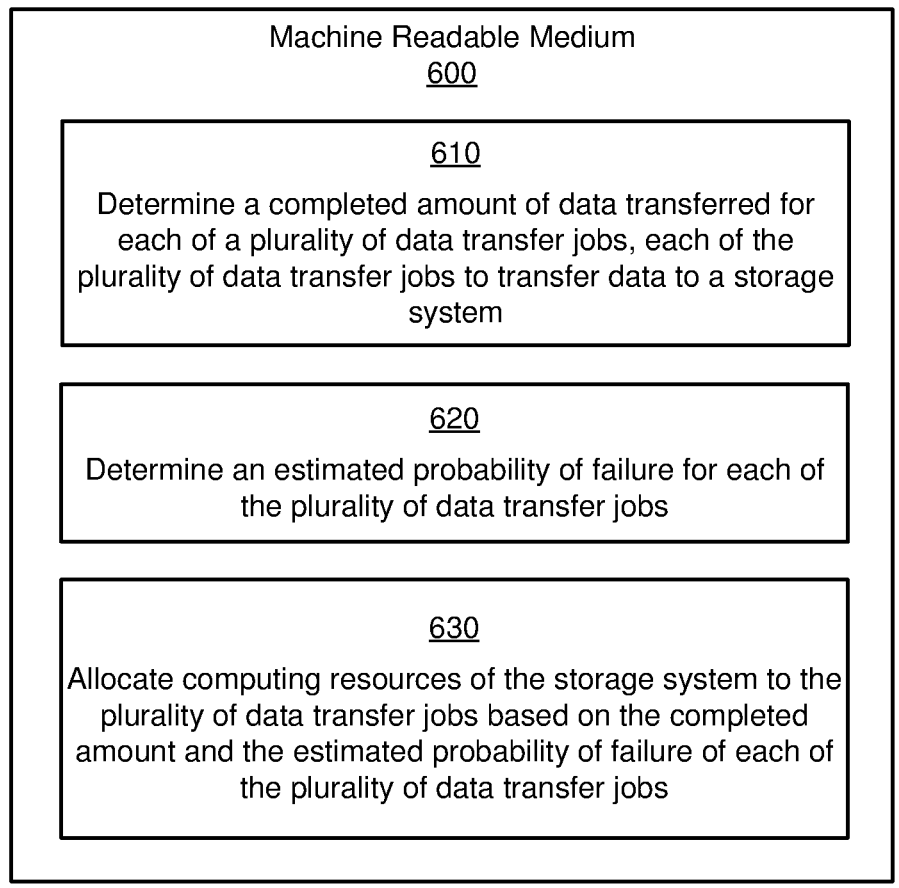
FIG. 6 is a diagram of an example machine-readable medium storing instructions in accordance with some implementations.

Referring now to FIG. 6, shown is machine-readable medium 600 storing instructions 610-630, in accordance with some implementations. The instructions 610-630 can be executed by a processor (e.g., all or part of the storage controller 110 shown in FIG. 1). The machine-readable medium 600 may be a non-transitory storage medium, such as an optical, semiconductor, or magnetic storage medium.

Instruction 610 may be executed to determine a completed amount of data transferred for each of a plurality of data transfer jobs, each of the plurality of data transfer jobs to transfer data to a storage system. For example, referring to FIG. 1, the storage controller 110 may determine how much data has already been transferred in each of the data transfer jobs 130A-130N. Further, the storage controller 110 may determine a rework cost based on the completed amount of each data transfer job 130.

Instruction 620 may be executed to determine an estimated probability of failure for each of the plurality of data transfer jobs. For example, referring to FIG. 1, the storage controller 110 may determine a transfer type of each data transfer job 130 based on its characteristics (e.g., transfer protocol, network connection type, software type, data type, data format, etc.). The storage controller 110 may perform a look-up to a data structure storing data indicating the historical failure rate for each transfer type, and may determine an estimated probability of failure for each data transfer job 130 based on the historical failure data.

Instruction 630 may be executed to allocate computing resources of the storage system to the plurality of data transfer jobs based on the completed amount and the estimated probability of failure of each of the plurality of data transfer jobs. For example, referring to FIGS. 1-3, the storage controller 110 may calculate the priority level of each data transfer job 130 by multiplying the rework cost and failure probability of each data transfer job 130. Further, the storage controller 110 may allocate a particular subset of the computing resources 120 to each data transfer job 130 based on the determined priority level. For example, the storage controller 110 may perform a look-up in the data structure 300 based on the priority level determined for each data transfer job 130, and may allocate computing resources to the data transfer jobs 130 based on the allocation data returned by the look-up to the data structure 300.

Figure 7:
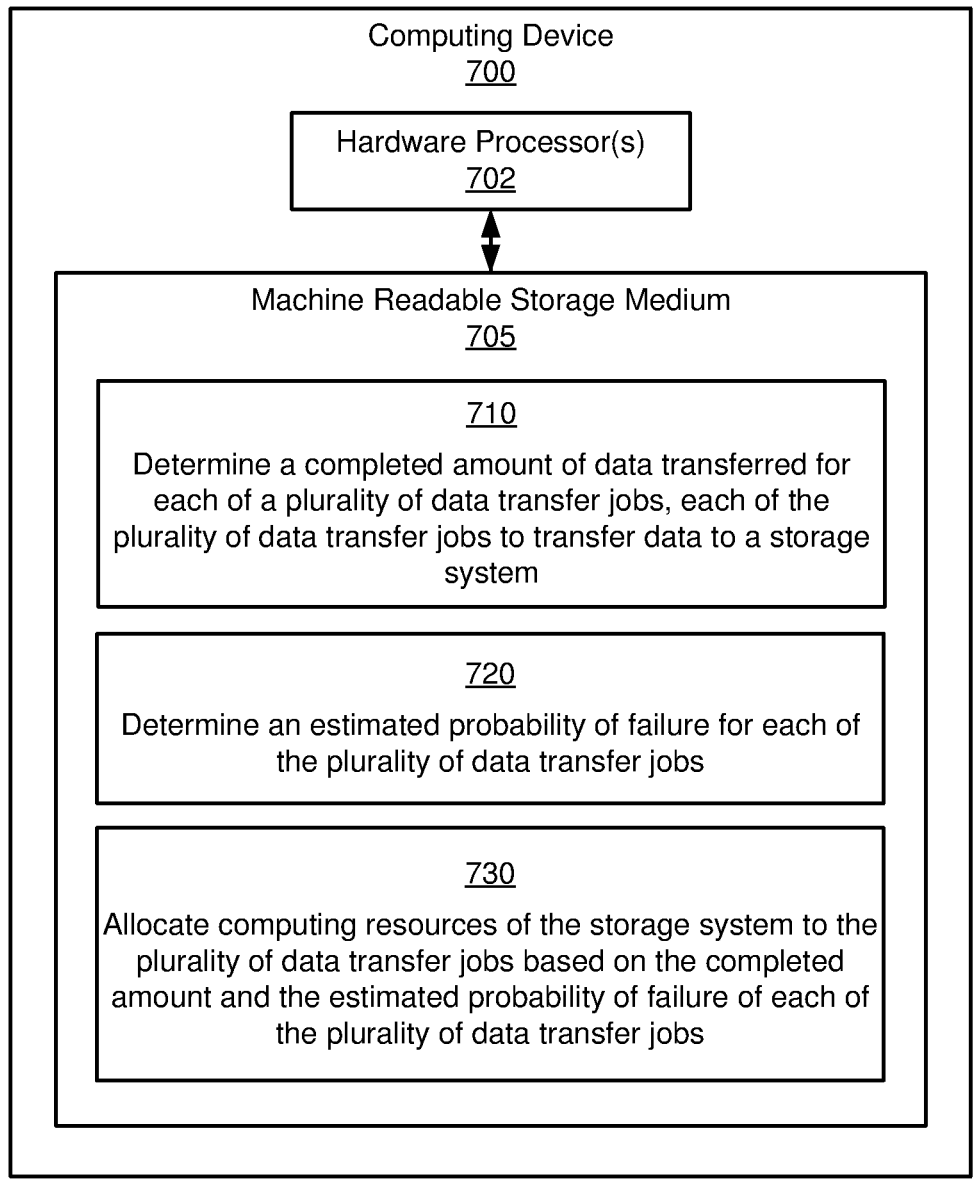
FIG. 7 is a schematic diagram of an example computing device, in accordance with some implementations.

Referring now to FIG. 7, shown is a schematic diagram of an example computing device 700. In some examples, the computing device 700 may correspond generally to all or part of the storage system 100 (shown in FIG. 1). As shown, the computing device 700 may include hardware processor 702 and machine-readable storage 705 including instruction 710-730. The machine-readable storage 705 may be a non-transitory medium. The instructions 710-730 may be executed by the hardware processor 702, or by a processing engine included in hardware processor 702.

Instruction 710 may be executed to determine a completed amount of data transferred for each of a plurality of data transfer jobs, each of the plurality of data transfer jobs to transfer data to a storage system. For example, referring to FIG. 1, the storage controller 110 may determine how much data has already been transferred in each of the data transfer jobs 130A-130N. Further, the storage controller 110 may determine a rework cost based on the completed amount of each data transfer job 130.

Instruction 720 may be executed to determine an estimated probability of failure for each of the plurality of data transfer jobs. For example, referring to FIG. 1, the storage controller 110 may determine a transfer type of each data transfer job 130 based on its characteristics (e.g., transfer protocol, network connection type, software type, data type, data format, etc.). The storage controller 110 may perform a look-up to a data structure storing data indicating the historical failure rate for each transfer type, and may determine an estimated probability of failure for each data transfer job 130 based on the historical failure data.

Instruction 730 may be executed to allocate computing resources of the storage system to the plurality of data transfer jobs based on the completed amount and the estimated probability of failure of each of the plurality of data transfer jobs. For example, referring to FIGS. 1-3, the storage controller 110 may calculate the priority level of each data transfer job 130 by multiplying the rework cost and failure probability of each data transfer job 130. Further, the storage controller 110 may allocate a particular subset of the computing resources 120 to each data transfer job 130 based on the determined priority level. For example, the storage controller 110 may perform a look-up in the data structure 300 based on the priority level determined for each data transfer job 130, and may allocate computing resources to the data transfer jobs 130 based on the allocation data returned by the look-up to the data structure 300.

Note that, while FIGS. 1-7 show various examples, implementations are not limited in this regard. For example, referring to FIG. 1, it is contemplated that the storage system 100 may include additional devices and/or components, fewer components, different components, different arrangements, and so forth. In another example, it is contemplated that storage controller 110 may be implemented in hardware, software, firmware, or any combination thereof. In yet another example, it is contemplated that the storage system 100 may include any number of processors, storage devices, memory units, network devices, and so forth. Other combinations and/or variations are also possible.

In accordance with some implementations, examples are provided for allocating computing resources to data transfer jobs to reduce the cost of rework due to system failures. In some implementations, the rework cost of each data transfer job may be determined based on the amount of data that has already been transferred for the data transfer job. Further, the failure probability of the data transfer job may be determined based on historical failure data associated with a type of the data transfer job. In some implementations, the priority level of each data transfer job may be determined based on the rework cost and the failure probability of the data transfer job. Further, each data transfer job may be allocated a proportion or level of computing resources based on the determined priority level, such that higher priority data transfer jobs get higher proportions of computing resources. In this manner, the high priority data transfer jobs may be completed more rapidly, and may thereby be less likely to be affected by a system failure.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
 a processor; and
 a machine-readable storage storing instructions, the instructions executable by the processor to:
  determine a completed amount of each data transfer job of a plurality of data transfer jobs, each data transfer job of the plurality of data transfer jobs to transfer data into a storage resource of a storage system;
  determine, for each data transfer job of the plurality of data transfer jobs, an estimated probability of a system failure that would prevent completion of the each data transfer job;
  for each data transfer job of the plurality of data transfer jobs, calculate a priority level of the each data transfer job based on the completed amount of the each data transfer job and the estimated probability of system failure determined for the each data transfer job;
  for each data transfer job of the plurality of data transfer jobs, allocate computing resources of the storage system to the each data transfer job based on the priority level calculated based on the completed amount of the each data transfer job and the estimated probability of system failure determined for the each data transfer job; and
 completing a remaining amount of each data transfer job of the plurality of data transfer jobs utilizing the allocated computing resources.

2. The computing device of claim 1, wherein the instructions to calculate the priority level of the each data transfer job comprise instructions to calculate the priority level of the each data transfer job as a product of the completed amount of the each data transfer job multiplied by the estimated probability of system failure determined for the each data transfer job.

3. The computing device of claim 1, wherein the instructions to allocate the computing resources comprise instructions to perform a look-up in a stored data structure comprising a plurality of entries, wherein each entry specifies a different combination of at least one priority level and at least one resource allocation.

4. The computing device of claim 1, the instructions executable by the processor to, for each data transfer job of the plurality of data transfer jobs:
 determine a transfer type of the each data transfer job;
 access historical failure data for the determined transfer type; and
 determine the estimated probability of system failure for the each data transfer job based on the historical failure data for the determined transfer type.

5. The computing device of claim 4, wherein the transfer type of the each data transfer job is determined based on one or more of:
 a transfer protocol of the each data transfer job;
 a network connection type of the each data transfer job;
 a software type of the storage system; and
 a data type of the each data transfer job.

6. The computing device of claim 1, wherein the allocated computing resources comprise a processor resource, a memory resource, a network resource, and the storage resource.

7. A non-transitory machine-readable medium storing instructions that upon execution cause a processor to:
  determine a completed amount of each data transfer job of a plurality of data transfer jobs, each data transfer job of the plurality of data transfer jobs to transfer data into a storage resource of a storage system;
  determine, for each data transfer job of the plurality of data transfer jobs, an estimated probability of a system failure that would prevent completion of the each data transfer job;
  for each data transfer job of the plurality of data transfer jobs, calculate a priority level of the each data transfer job based on the completed amount of the each data transfer job and the estimated probability of system failure determined for the each data transfer job;
  for each data transfer job of the plurality of data transfer jobs, allocate computing resources of the storage system to the each data transfer job based on the priority level calculated based on the completed amount of the each data transfer job and the estimated probability of system failure determined for the each data transfer job; and
  completing a remaining amount of each data transfer job of the plurality of data transfer jobs utilizing the allocated computing resources.

8. The non-transitory machine-readable storage medium of claim 7, wherein the instructions to calculate the priority level of the each data transfer job comprise instructions to calculate the priority level of the each data transfer job as a product of the completed amount of the each data transfer job multiplied by the estimated probability of system failure determined for the each data transfer job.

9. The non-transitory machine-readable storage medium of claim 7, wherein the instructions to allocate the computing resources comprise instructions to perform a look-up in a stored data structure comprising a plurality of entries, wherein each entry specifies a different combination of at least one priority level and at least one resource allocation.

10. The non-transitory machine-readable storage medium of claim 7, including instructions to cause the processor to, for each data transfer job of the plurality of data transfer jobs:
  determine a transfer type of the each data transfer job;
  access historical failure data for the determined transfer type; and
  determine the estimated probability of system failure for the each data transfer job based on the historical failure data for the determined transfer type.

11. The non-transitory machine-readable storage medium of claim 10, wherein the transfer type of the each data transfer job is determined based on one or more of:
  a transfer protocol of the each data transfer job;
  a network connection type of the each data transfer job;
  a software type of the storage system; and
  a data type of the each data transfer job.

12. The non-transitory machine-readable storage medium of claim 7, wherein the allocated computing resources comprise a processor resource, a memory resource, a network resource, and the storage resource.

13. A computer implemented method, comprising:
  determining, by a storage system, a completed amount of each data transfer job of a plurality of data transfer jobs, each data transfer job of the plurality of data transfer jobs to transfer data into a storage resource of the storage system;
  determining, by the storage system for each of the plurality of data transfer jobs, an estimated probability of a system failure that would prevent completion of the each data transfer job;
  for each data transfer job of the plurality of data transfer jobs, calculating, by the storage system, a priority level of the each data transfer job based on the completed amount of the each data transfer job and the estimated probability of system failure determined for the each data transfer job;
  for each data transfer job of the plurality of data transfer jobs, allocating, by the storage system, computing resources of the storage system to the each data transfer job based on the priority level calculated based on the completed amount of the each data transfer job and the estimated probability of system failure determined for the each data transfer job; and
  completing a remaining amount of each data transfer job of the plurality of data transfer jobs utilizing the allocated computing resources.

14. The computer implemented method of claim 13, wherein calculating the priority level of the each data transfer job comprises multiplying the completed amount of the each data transfer job times the estimated probability of system failure determined for the each data transfer job.

15. The computer implemented method of claim 13, wherein allocating the computing resources comprises performing a look-up in a stored data structure comprising a plurality of entries, wherein each entry specifies a different combination of at least one priority level and at least one resource allocation.

16. The computer implemented method of claim 13, comprising:
  for each data transfer job of the plurality of data transfer jobs:
    determining a transfer type of the each data transfer job;
    accessing historical failure data for the determined transfer type; and
    determining the estimated probability of system failure for the each data transfer job based on the historical failure data for the determined transfer type.

17. The computer implemented method of claim 16, wherein the transfer type of the each data transfer job is determined based on one or more of:
  a transfer protocol of the each data transfer job;
  a network connection type of the each data transfer job;
  a software type of the storage system; and
  a data type of the each data transfer job.

18. The computer implemented method of claim 13, wherein the calculated priority level of the each data transfer job increases as a function of the completed amount of the each data transfer job.

19. The computing device of claim 1, wherein the calculated priority level of the each data transfer job increases as a function of the completed amount of the each data transfer job.

20. The non-transitory machine-readable storage medium of claim 7, wherein the calculated priority level of the each data transfer job increases as a function of the completed amount of the each data transfer job.

* * * * *